United States Patent [19]

Watanabe et al.

[11] Patent Number: 4,849,496

[45] Date of Patent: Jul. 18, 1989

[54] KETONE CONTAINING TERPOLYMER

[75] Inventors: Yoshihisa Watanabe; Makoto Takeda; Hisao Kinoshita; Akiko Fujishima, all of Ibaraki, Japan

[73] Assignee: Mitsubishi Petrochemical Co., Ltd., Tokyo, Japan

[21] Appl. No.: 163,840

[22] Filed: Mar. 3, 1988

[30] Foreign Application Priority Data

Mar. 6, 1987 [JP] Japan .................................. 62-51733

[51] Int. Cl.$^4$ ............................................. C08G 67/02
[52] U.S. Cl. .................... 528/271; 525/539; 528/392
[58] Field of Search ................. 528/271, 392; 525/539

[56] References Cited

U.S. PATENT DOCUMENTS

| 4,137,382 | 1/1979 | Vetter | 528/271 |
| 4,172,939 | 10/1979 | Hoh | 528/271 |
| 4,543,440 | 9/1985 | Loomis | 528/271 |

Primary Examiner—Harold D. Anderson
Attorney, Agent, or Firm—Oblon, Spivak, McClelland, Maier & Neustadt

[57] ABSTRACT

A terpolymer whose backbone chain is composed of the following building units is described:

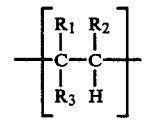

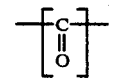

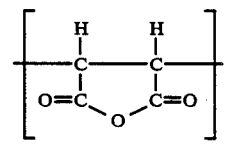

wherein $R_1$, $R_2$ and $R_3$ each is H or an alkyl group selected from among $CH_3$ and $C_2H_5$.

Further, a polyelectrolyte made either of a terpolymer or of a derivative thereof is also described.

10 Claims, No Drawings

KETONE CONTAINING TERPOLYMER

FIELD OF THE INVENTION

The present invention relates to a novel polymeric compound and a novel polyelectrolyte prepared therefrom.

The polymeric compound of the present invention and/or a hydrolyzate and a salt thereof are unique polyelectrolytes having ketone groups in their molecule. Most polyelectrolytes, when crosslinked, become water-insoluble and acquire the property of swelling upon absorbing a large amount of water. Because of this nature, polyelectrolytes have been used in a broad area of applications as a variety of water-absorbing materials. Polyelectrolytes also are very important as builders that are incorporated in detergents to enhance their detergency. Other applications of polyelectrolytes are as a variety of thickeners, flocculating agents, and dispersants of pigments, etc.

BACKGROUND OF THE INVENTION

Polymeric compounds having CO groups in the backbone chain have been known in the art and typical examples are polyketones produced by copolymerization of ethylene and carbon monoxide. The synthesis of such polyketones is fairly old and was first discovered by F. Ballauf et al. in 1941 (German Pat. No. 863,711). Since then, many improvements have been proposed.

A variety of polymeric compounds retaining a number of carboxyl groups in the molecule, such as polyacrylic acid and copolymers of maleic acid with other olefinic compounds have been extensively used as polyelectrolytes for many years. A number of resins capable of high water absorption have also been proposed; they include the products of crosslinking of sodium polyacrylate with chlorohydrin, 1,3-dichloroisopropanol, glycidyl ether, etc. (Japanese Laid-Open Patent Application No. 82143/75); the product of crosslinking with polyvalent metal ions (Japanese Laid-Open Patent Application No. 112787/76); and copolymers of vinyl acetate and acrylic acid salts.

Polyelectrolytes intended for use as builders in detergents have also been proposed and they include: polyacrylic acid salts (Japanese Laid-Open Patent Application No. 43707/72); the copolymer of maleic anhydride and ethylene (U.S. Pat. No. 3,764,586); and the copolymers of maleic anhydride and long-chain alkylenes (Japanese Laid-Open Patent Application No. 12807/73).

However, the so far proposed polyelectrolytes do not have high environmental degradability and because of their potential hazard of pollutions due to residual products, the use of such polyelectrolytes has been limited.

Attempts have been made to introduce CO groups in the backbone chain of conventional polyelectrolytes and an approach based on copolymerizing maleic anhydride with carbon monoxide is described in U.S. Pat. No. 3,764,586. However, the experiments conducted by the present inventors have revealed that the yield of the copolymer produced by this method is too low to warrant its commercial use.

The present invention offers a solution to these problems of the prior art by providing a novel terpolymer having CO groups in the backbone chain. The novel terpolymer of the present invention can be used as a highly water-absorbing resin, a detergent builder, etc. which exhibit improved performance and can be discarded after use without any potential risk of environmental pollution. Therefore, the advent of the novel terpolymer of the present invention will contribute to expansion of the area where polyelectrolytes can be employed with advantage. In particular, the terpolymer will find great commercial value as a detergent builder since its performance is comparable to that of condensed phosphates such as sodium tripolyphosphate (STPP) and because it is advantageous over the latter in terms of reduced eutrophication, improved biodegradability and increased safety to humans.

Because of their high performance and low cost, STPP have been used most commonly as builders in detersive systems. However, with the concern over eutrophication of rivers and lakes due to the increased content of phosphorus compounds in surface water, shifting to builders other than condensed phosphate compounds has recently been undertaken at a rapid pace. For example, zeolites which are inorganic compounds that have no potential problems with eutrophication or human toxicity have been proposed as substitutes for condensed phosphate compounds. However, being water-insoluble solids, zeolites are not completely satisfactory in performance and the detergency of systems incorporating zeolites as builders is inferior to that of systems employing STPP. Furthermore, zeolites cannot be incorporated in liquid detersive systems. Under these circumstances, compounds having the ability to sequester metal ions comparable to that of STPP have been reviewed and the polyelectrolytes so far developed to meet this need include polyvalent carboxylic acids such as citric acid and succinic acid, N-containing carboxylic acids such as nitrilotriacetic acid, polyacrylic acid, as well as the aforementioned copolymer of maleic anhydride and ethylene (U.S. Pat. No. 3,764,586) and copolymers of maleic anhydride and long-chain alkylenes (Japanese Laid-Open Patent Application No. 12807/73).

SUMMARY OF THE INVENTION

The present inventors undertook various investigations in order to solve the aforementioned problems of the prior art and found as a result that a novel terpolymer containing ketone groups in the backbone chain could be produced by copolymerizing maleic anhydride and carbon monoxide in the presence of an olefin. It was quite surprising that a terpolymer incorporating 'CO groups in the backbone chain could be readily obtained in a high yield by copolymerizing carbon monoxide and maleic anhydride in the presence of an olefinic compound.

Therefore, in one aspect, the present invention provides a novel terpolymer whose backbone chain is composed of the following building units:

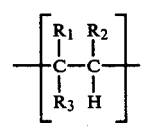

(1)

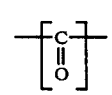

(2)

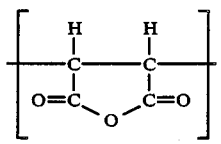

wherein $R_1$, $R_2$ and $R_3$ each is H, or an alkyl group selected from among $CH_3$ and $C_2H_5$.

In another aspect, the present invention provides a polyelectrolyte made either of a novel terpolymer whose backbone chain is composed of the following building units or of a derivative thereof:

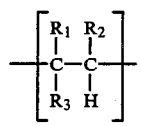

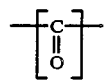

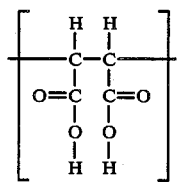

wherein $R_1$, $R_2$ and $R_3$ each is H, or an alkyl group selected from among $CH_3$ and $C_2H_5$.

DETAILED DESCRIPTION OF THE INVENTION

The terpolymer prepared according to one aspect of the present invention consists of 5 to 80 mol %, preferably to 70 mol %, of building unit (1), 0.1 to 40 mol %, preferably 0.5 to 25 mol %, of building unit (2) and 10 to 90 mol %, preferably 20 to 80 mol %, of building unit (3), provided that the sum of building units (1), (2) and (3) is 100 mol %. This terpolymer has a molecular weight in the range of 500 to 1,000,000, preferably 1,000 to Several methods of organic synthesis are available for producing the terpolymer composed of building units (1), (2) and (3) and industrially the most advantageous method is the copolymerization reaction of an olefin, carbon monoxide and maleic anhydride. This copolymerization reaction may be performed by any usual technique of radical polymerization. The reaction may be initiated with heat, light, radiation, etc., but it is most preferred to perform the reaction in the presence of commonly employed radical initiators.

The reaction usually starts with charging a pressurized reaction vessel with maleic anhydride, a solvent and a radical initiator and is carried out with heat and pressure applied after supplying an olefin and carbon monoxide into the vessel.

The presence of an olefin is essential for allowing the desired copolymerization reaction to proceed smoothly and it is otherwise difficult to obtain the intended terpolymer composition in high yield. Any olefin that is capable of forming building unit (1) can be employed and suitable examples are ethylene, propylene, 1-butene, 2-butene, isobutene, pentenes, hexenes, etc., with ethylene, propylene, etc. being most preferred in view of yield and reactivity.

The reaction may be performed by a batch system in which the necessary amounts of the reactants, initiator and solvent are charged altogether into a reaction vessel, or by a continuous or semicontinuous method in which part or all of the starting materials and initiator are supplied either continuously or intermittently together with a solvent.

While there is no particular limitation on the reaction conditions that can be employed, the pressure of carbon monoxide is usually set to a value between 2 and 800 atm. and the molar ratio of olefin to carbon monoxide is usually selected at 0.001 to 100, preferably at 0.01 to 5. The reaction temperature may be set to any value that matches the temperature of decomposition of the radical initiator used, with the reaction usually taking place at a temperature in the range of from room temperature up to about 250° C.

A suitable radical initiator may be selected from among commonly employed compounds such as peroxides, azobisnitriles, etc. More specific examples include: inorganic peroxides such as hydrogen peroxide, persulfuric acid; azobisnitriles (e.g., 2,2'-azobisisobutyronitrile, 2,2'-azobispropionitrile, and 2,2'-azobisvaleronitrile); azo and diazo compounds (e.g., diazoaminobenzene, nitrosoacylallylamines, azothioethers, p-nitrobenzene diazonium salts, etc.); organic peroxides such as benzoyl peroxide, nuclear substituted benzoyl peroxide, lauroyl peroxide, acetyl peroxide, ketone peroxides, cumene hydroperoxide, di-t-butyl hydroperoxide, etc.; aromatic sulfinic acids; 1-alkanesulfinic acid salts; etc. The choice of a reaction solvent depends on such factors as the solubility of maleic anhydride as a starting material and the decomposability of the radical initiator used. Examples of the solvents that can be generally used include aromatic compounds such as benzene, toluene, xylene, etc., as well as halogen compounds such as chloroform, carbon tetrachloride, etc.

A terpolymer having a carboxylic acid or a salt thereof which is composed of building units (1'), (2') and (3') may be produced by several methods and the simplest and easiest way is to prepare the terpolymer composed of building units (1), (2) and (3) wherein maleic anhydride is used, then saponifying this terpolymer by a standard technique. The common method of saponification is to immerse the terpolymer in water and adjust the pH of this system to a value within the range of 4 to 12, preferably 7.5 to 11, with KOH, NaOH, $NH_4OH$ or an amine.

The polyelectrolyte made of either the terpolymer whose backbone chain is composed of building units (1'), (2') and (3') or a derivative thereof consists of 5 to 80 mol %, preferably 10 to 70 mol %, of building unit (1'), 0.1 to 40 mol %, preferably 0.5 to 25 mol %, of building unit (2'), and 10 to 90 mol %, preferably 20 to 80 mol %, of building unit (3'), provided that the sum of building units (1'), (2') and (3') is 100 mol %. This polyelectrolyte has a molecular weight in the range of 500 to 1,000,000 which may vary according to the specific use of the polymer. If it is to be used as a detergent builder, the molecular weight is selected at such a value that is approximately in the range of 1,000 to 500,000, preferably 10,000 to 300,000; if it is to be used as a water-absorbing resin, values approximately in the range of 5,000 to 500,000 are selected.

The terpolymer composition of the present invention is unique in that it contains CO group in the backbone chain of the terpolymer. Because of the presence of CO groups in the backbone chain, this terpolymer is readily cleaved and decomposed by the action of light or microorganisms and offers particular advantages when used as a builder, a water-absorbing material or in other applications where the formation of residual products in the environment after use can cause a serious problem.

The terpolymer salt of the present invention is useful as a builder which, when used with ordinary surfactants, exhibits a detergency comparable to that of STPP. In addition, this terpolymer salt is capable of offering a detergent composition which is easily degradable by microorganisms without causing eutrophication of lakes and is less toxic to humans than when STPP is used as a binder.

The terpolymer salt used as a builder is a polyelectrolyte in which the acid anhydride building unit (3) has been saponified and it may be in the form of an alkali metal salt such as sodium salt, potassium salt, etc., an alkaline earth metal salt such as magnesium salt, etc., an ammonium salt, or an amine salt such as triethanolamine salt, etc., with it being preferably in the form of a sodium salt, a potassium salt, or a triethanolamine salt. The detergent composition incorporating this terpolymer salt as a builder is particularly useful in laundering apparel.

Surfactants that may be used with the terpolymer salt of the present invention are exemplified by: anionic surfactants such as straight-chained or branched alkylbenzenesulfonates, alkyl or alkenyl ether sulfates, alkyl or alkenyl sulfates, α-sulfo-fatty acid salts or ester salts, alkane or alkenesulfonates, saturated or unsaturated aliphatic acid salts, alkyl or alkenyl ether carboxylates, amino acid type surfactants, alkyl or alkenyl phosphate esters or salts, etc.; nonionic surfactants such as polyalkylene glycol alkyl ethers, polyalkylene glycol alkyl phenyl ethers, polyalkylene glycol fatty acid esters, sorbitan fatty acid esters, alkyl polyglycoxides, fatty acid dialkanol amides, etc.; cationic surfactants such as alkyl trimethyl ammonium chlorides, dialkyl dimethyl ammonium chlorides, etc.; and amphoteric surfactants such as alkyl dimethyl amine oxides, alkyl dimethyl sulfopropyl betaines, etc. Preferably, at least one surfactant selected from among these nonionic and anionic types is employed. For designing detersive systems adapted to apparel laundering, combinations of nonionic and anionic surfactants are particularly preferred.

These surfactants are incorporated in detergent compositions in amounts ranging from 5 to 60%, preferably from 10 to 40%, of the weight of the detergent composition.

The terpolymer salt of the present invention is incorporated in a detergent composition in an amount ranging from 0.05 to 50%, preferably from 1 to 25%, of the weight of the composition. If the content of terpolymer salt is too small, its ability to prevent redeposition of soil is insufficient not to ensure high detergency.

A substance that imparts alkalinity of a sufficient degree to warrant the effectiveness of the builder salt may be added in a detergent composition. Any substance that shifts the pH of an aqueous solution of the detergent system to the alkaline range may be used as an alkalifying agent and suitable examples include inorganic builders such as sodium hydroxide, sodium carbonate, sodium silicate, and sodium borate, triethanolamine, and condensed alkali salts of phosphoric acid such as STPP, etc. These alkalifying agents are incorporated in amounts ranging from 1 to 50%, preferably from 5 to 40%, of the weight of the detergent composition.

These alkalifying agents may be incorporated in such amounts that the sum of the terpolymer builder salt and the alkalifying agent is at least 5% of the weight of the composition.

Various formulations may be employed depending upon the form in which a detergent composition is used, such as a powder, a liquid, etc., as well as upon the type of an article to be cleaned, the type of soil to be removed, etc. If necessary, other various ingredients may be incorporated as exemplified by inorganic acid salts such as Glauber's salt, solvents such as water, ethanol, isopropanol, ethylene glycol, cellosolve, carbitol, etc., solubilizing agents such as urea, paratoluenesulfonic acid, etc., abrasives such as talc, fine powdered silica, etc., oxidizing bleaching agents such as hydrogen peroxide, sodium peroxide, etc., reducing bleaching agents such as sodium bisulfite, and antiredeposition agents such as carboxymethyl cellulose, etc. Other ingredients that may be incorporated include enzymes, fluorescent dyes, perfumes, colorants, antiseptics, chelating agents, etc.

The way how the detergent composition is used is by no means limited and the usual method is to use it as a 1:50 to 1:10,000 dilution in water. The composition may be used to wash dishes, clean the interior of residential buildings, etc., but it is particularly advantageous to use the composition as a detergent for fibrous products such as those made from natural fibers (e.g., cotton, wool and hemp), synthetic fibers (e.g. polyesters, nylon and polyacrylics), or from blends of natural and synthetic fibers.

The following examples are provided for the purpose of further illustrating the present invention but are in no way to be taken as limiting.

EXAMPLE 1

A 200 ml Hastelloy C autoclave equipped with an inductive stirrer and a heating jacket was charged with 100 ml of a toluene solution containing 20 g of maleic anhydride and with 1.25 g of benzoyl peroxide. The autoclave was closed and purged 6 times with ethylene pressurized to 10 kg/cm$^2$G (gage pressure). Thereafter, the autoclave was supplied with ethylene at 100 kg/cm$^2$G, and then with carbon monoxide at 400 kg/cm$^2$G. With stirring, the temperature of the reaction mixture in the autoclave was adjusted to 95 ±2° C. by means of the heating jacket and reaction was carried out for 4 hours. The reactor was then cooled, degassed and opened to recover the slurry. The slurry was suspended in 200 ml of diethyl ether and the insoluble matter was separated by filtration, washed with diethyl ether and dried. The recovered polymer weighed 23.8 g (119 wt % yield based on maleic anhydride).

Elemental analysis by $C_{13}$-NMR, H-NMR and IR techniques showed that the polymer was a terpolymer composed of the following building units at a molar ratio of 1/0.08/1:

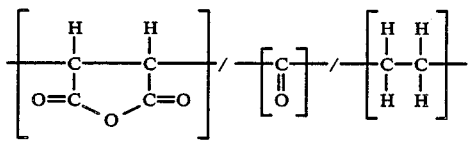

This polymer was found to have a molecular weight of 28,000 as measured by GPC (gel permeation chromatography) as a molecular weight of polyethyleneglycol.

A sample of this polymer was mixed with distilled water and then with an aqueous solution of 20 wt % sodium hydroxide to make a pH of the resulting solution to 10. A clear pale yellow solution formed. After adjusting the solute concentration, the solution was treated in MeOH to obtain a solid white Na salt of the copolymerized acid anhydride.

EXAMPLES 2 to 4

Reactions were carried out as in Example 1 except that the pressure of carbon monoxide was held at 40 kg/cm$^2$G and that the reaction mixture was held at 70° C. with varying ethylene pressures (see Table 1). The results are also shown in Table 1.

TABLE 1

| Example No. | Ethylene Pressure (kg/cm$^2$G) | Yield (g) | Yield* (wt %) | Molecular Weight (Mn$^-$) |
| --- | --- | --- | --- | --- |
| 2 | 40 | 4.6 | 23.0 | 48900 |
| 3 | 80 | 15.7 | 78.3 | 51400 |
| 4 | 147 | 23.1 | 115.4 | 66100 |

*Based on the maleic anhydride charged.

COMPARATIVE EXAMPLES 1 AND 2

A 200 ml Hastelloy C autoclave equipped with an inductive stirrer and a heating jacket was charged with 100 ml of a benzene solution containing 25 g of maleic anhydride and with 1.25 g of benzoyl peroxide. The autoclave was closed and purged 6 times with carbon monoxide at 10 kg/cm$^2$G. Thereafter, the autoclave was supplied with carbon monoxide at 100 kg/cm$^2$G. With constant stirring, the temperature of the reaction mixture in the autoclave was adjusted to 95 ±2° C. by means of the heating jacket and reaction was carried out for 4 hours. The reactor was then cooled, degassed and opened to recover the slurry. The slurry was suspended in 200 ml of diethyl ether and the insoluble matter was separated by filtration, washed with benzene and dried. The recovered polymer weighed 3.0 g, which was equivalent to a yield of 12.0 wt % in terms of maleic anhydride.

Comparative Example 2 was run in the same manner as Comparative Example 1 except that the pressure of carbon monoxide was adjusted to 500 kg/cm$^2$G. The results of the two comparative examples are summarized in Table 2.

EXAMPLE 5

The terpolymer prepared in Example 3 was saponified to obtain a corresponding disodium salt, which was dissolved in deionized water to prepare a 25 wt % aqueous solution. Ten grams (10.0 g) of the solution was mixed with 0.2 g of epibromohydrin, 1 ml of water, and 4 drops of 2% sodium laurylsulfonate. The mixture was spread on a glass plate to form film, which was dried by being left at room temperature and 55° C. for one day and night. The dried film was peeled off the glass plate and held at 100° C. for 3 hours. When it was immersed in an aqueous solution, the film adsorbed about 60 g/g of water.

EXAMPLE 6

The polymeric disodium salt prepared in the same manner as in Example 1 and the disodium salt obtained by saponifying the polymer prepared in Comparative Example 2 were subjected to a biodegradation test by the method recommended in Kagaku Busshitsu Shinsa Kiseiho (Regulations on Examination of Chemical Substances) using a closed system apparatus for determining oxygen consumption. A test substance (100 ppm) and activated sludge (60 ppm) were added to a basic culture medium (200 ml) and the time-dependent change of oxygen consumption in the medium was measured with vigorous stirring at 25 ±1° C. A similar experiment was conducted on aniline used as a control. The effectiveness of this test was verified by the fact that aniline was decomposed by at least 40% in 7 days. In this test, the polymer salt prepared in Example 1 was degraded about twice as fast, as the salt prepared by saponifying the polymer obtained in Comparative Example 2. The high biodegradability of the former polymer was therefore confirmed.

EXAMPLE 7

A 200 ml Hastelloy C autoclave equipped with an inductive stirrer and a heating jacket was closed, purged 6 times with pressurized ethylene (10 kg/cm$^2$G), and supplied first with ethylene at 20 kg/cm$^2$G and then with carbon monoxide at 50 kg/cm$^2$G. Toluene (50 ml) was supplied into the autoclave by means of a high-pressure metering pump and, with stirring at 1,000 rpm, the temperature of the reaction mixture in the autoclave was adjusted to 112±2° C. by means of the heating jacket. Thereafter, a polymerization reaction was performed for 1 hour as 59.25 g of an acetone solution containing 20 g of maleic anhydride and 1.25 g of benzoyl peroxide was supplied at a rate of 0.988 g/min by means of a high-pressure metering pump. During the reaction, the average concentration of maleic anhydride in the mixed solution of toluene and acetone was held at 79 mmol per 100 ml of the solvent.

After the reaction, the reactor was cooled, degassed and opened to recover the slurry. The slurry was suspended in 200 ml of diethyl ether and the insoluble matter was separated by filtration, washed with diethyl

TABLE 2

| Comparative Example No. | CO Pressure (kg/cm$^2$G) | Reaction Temperature (°C.) | Yield (g) | Yield* (wt %) | Molecular Weight (Mn$^-$) |
| --- | --- | --- | --- | --- | --- |
| 1 | 100 | 95 | 3.0 | 12.0 | 15500 |
| 2 | 500 | 95 | 4.8 | 24.1 | 11700 |

*Based on maleic anhydride charged.

ether and dried. A terpolymer was obtained in an amount of 15.9 g.

The terpolymer was mixed with distilled water and then with an aqueous solution of 20 wt % NaOH to make a pH of the resulting solution to 10. A clear pale yellow solution formed. The solution was poured into methanol to obtain a polyelectrolyte as a white powder.

After saponification, the polyelectrolyte was analyzed to have a CO content of 3.8 mol % and a maleic acid content of 27.6 mol %.

EXAMPLE 8

A polymerization reaction was performed by employing the same procedures and conditions as in Example 7 except that ethylene was supplied into the autoclave at a pressure of 40 kg/cm$^2$G.

During the reaction, the average concentration of maleic anhydride in the mixed solution of toluene and acetone was held at 42 mmol per 100 ml of the solvent.

By the same treatment conducted under the same conditions as those employed in Example 7, a terpolymer was obtained in an amount of 24.1 g. After saponification, the polyelectrolyte was analyzed to have a CO content of 6.4 mol % and a maleic acid content of 28.1 mol %.

EXAMPLE 9

A 200 ml Hastelloy C autoclave equipped with an inductive stirrer and a heating jacket was closed, purged 6 times with pressurized ethylene (10 kg/cm$^2$G) and supplied first with ethylene at 40 kg/cm$^2$G and then with carbon monoxide at 100 kg/cm$^2$G. Toluene (25 ml) was supplied into the autoclave by means of a high-pressure metering pump and, with stirring at 1,000 rpm, the temperature of the reaction mixture in the autoclave was adjusted to 112±2° C. by means of the heating jacket. Thereafter, a polymerization reaction was performed for 4 hours as 80.4 g of a toluene solution containing 15 g of maleic anhydride and 0.125 g of benzoyl peroxide was supplied at a rate of 20.1 g/h by means of a high-pressure metering pump.

During the reaction, the average concentration of maleic anhydride in the toluene solution was held at 70 mmol per 100 ml of the solvent.

By the same treatment conducted under the same conditions as those employed in Example 8, a terpolymer was obtained in an amount of 6.8 g.

After saponification, the polyelectrolyte was analyzed to have a CO content of 4.6 mol % and a maleic acid content of 41.2 mol %.

EXAMPLE 10

A 200 ml Hastelloy C autoclave equipped with an inductive stirrer and a heating jacket was closed, purged 6 times with pressurized ethylene (10 kg/cm$^2$G) and supplied first with ethylene at 40 kg/cm$^2$G and then with carbon monoxide at 100 kg/cm$^2$G. Toluene (25 ml) was supplied into the autoclave by means of a high-pressure metering pump and, with stirring at 1,000 rpm, the temperature of the reaction mixture in the autoclave was adjusted to 100±2° C. by means of the heating jacket. Thereafter, a polymerization reaction was performed for 6 hours as 81.05 g of a toluene solution containing 15 g of maleic anhydride and 0.750 g of benzoyl peroxide was supplied at a rate of 13.51 g/h by means of a high-pressure metering pump.

During the reaction, the average concentration of maleic anhydride in the toluene was held at 15 mmol per 100 ml of the solvent.

By the same treatment conducted under the same conditions as those employed in Example 8, a terpolymer was obtained in an amount of 20.7 g.

After saponification, the polyelectrolyte was analyzed to have a CO content of 13.4 mol % and a maleic acid content of 32.0 mol %.

The results of Examples 7 to 10 are summarized in Table 4.

TABLE 4

| Example No. | CO Pressure (kg/cm$^2$G) | C$_2$H$_4$ Pressure (kg/cm$^2$G) | Reaction Temperature (°C.) | Reaction Time (h) | Yield (g) | Conversion (mol %) | MAH Concentration | CO Content (mol %) | MAH Content (mol %) |
|---|---|---|---|---|---|---|---|---|---|
| 7 | 50 | 20 | 112 | 1 | 15.9 | 45.6 | 79 | 3.8 | 27.6 |
| 8 | 50 | 40 | 112 | 1 | 24.1 | 69.7 | 42 | 6.4 | 28.1 |
| 9 | 100 | 40 | 112 | 4 | 6.8 | 32.2 | 70 | 4.6 | 41.2 |
| 10 | 100 | 40 | 100 | 6 | 20.7 | 85.7 | 15 | 13.4 | 32.0 |

MAH: Maleic anhydride
MAH concentration: Average value in autoclave (mmol/100 ml solvent)
Conversion: Based on charged MAH

COMPARATIVE EXAMPLE 3

A 200 ml Hastelloy C autoclave equipped with an inductive stirrer and a heating jacket was charged with 100 ml of a benzene solution containing 30 g of maleic anhydride and 0.3 g of benzoyl peroxide. The autoclave was closed and purged 6 times with pressurized ethylene at 10 kg/cm$^2$G. Thereafter, the autoclave was supplied with ethylene at 50 kg/cm$^2$G. With stirring at 1,000 rpm, the temperature of the reaction mixture in the autoclave was adjusted to 70±2° C. by means of the heating jacket and reaction was carried out for 4 hours. The reactor was then cooled, degassed and opened to recover the slurry. The slurry was suspended in 200 ml of diethyl ether and the insoluble matter was separated by filtration, washed with diethyl ether and dried. A copolymer was obtained in an amount of 22.3 g.

The copolymer was mixed with distilled water and then with an aqueous solution of 20 wt % NaOH to make a pH of the resulting solution to 10. A clear and colorless solution formed.

The solution was poured into methanol to obtain a polyelectrolyte as a white powder. This polyelectrolyte was a CO-free copolymer of maleic acid and ethylene.

An aqueous solution of the polyelectrolyte was subjected to a photodegradation test with a photodegrading apparatus and the change in its molecular weight was measured by GPC. The results are shown in Table 5.

Details of the test condition are noted below.

Photodegradation

Light source: high-pressure mercury lamp, 100 W
Temperature : 27° C.

1% Aqueous solution of polyelectrolyte: 200 ml

Molecular weight measurement by GPC

Column: Shodex OHpak
Flow rate: 1 ml/min
Column temperature: 40° C.
Eluent 0.05M aqueous solution of KCl

EXAMPLE 11

A 200 ml Hastelloy C autoclave equipped with an inductive stirrer and a heating jacket was closed, purged 6 times with pressurized ethylene (10 kg/cm$^2$G) and supplied first with ethylene at 40 kg/cm$^2$G and then with carbon monoxide at 100 kg/cm$^2$G. Benzene (25 ml) was supplied into the autoclave by means of a high-pressure metering pump and, with stirring, the temperature of the reaction mixture in the autoclave was adjusted to 70±2° C. by means of the heating jacket. Thereafter, a polymerization reaction was performed for 12 hours as 81.1 g of a benzene solution containing 15 g of maleic anhydride and 0.750 g of benzoyl peroxide was supplied at a rate of 0.113 g/min by means of a high-pressure metering pump.

By the same treatment conducted under the same conditions as those employed in Comparative Example 3, a terpolymer was obtained in an amount of 19.5 g. After saponification, the polyelectrolyte was analyzed to have a CO content of 8.0 mol %. An aqueous solution of this polyelectrolyte was subjected to a photodegradation test as in Comparative Example 3 and the results are shown in Table 5.

EXAMPLE 12

A 1,100 ml Hastelloy C autoclave equipped with an inductive stirrer and a heating jacket was closed, purged 6 times with pressurized ethylene (10 kg/cm$^2$G) and supplied first with ethylene at 40 kg/cm$^2$G and then with carbon monoxide at 100 kg/cm$^2$G. Benzene (250 ml) was supplied into the autoclave by means of a high-pressure metering pump and, with stirring, the temperature of the reaction mixture in the autoclave was adjusted to 70±2° C. by means of the heating jacket. Thereafter, a polymerization reaction was carried out for 12 hours as 414.4 g of a benzene solution containing 75 g of maleic anhydride and 5.630 g of benzoyl peroxide was supplied at a rate of 0.576 g/min by means of a high-pressure metering pump.

By the same treatment conducted under the same conditions as those employed in Comparative Example 3, a terpolymer was recovered in an amount of 100.7 g. After saponification, the polyelectrolyte was analyzed to have a CO content of 12.1 mol %. An aqueous solution of the polyelectrolyte was subjected to a photodegradation test as in Comparative Example 3 and the results are also shown in Table 5.

TABLE 5

| | CO Content (mol %) | Molecular Weight and [Its Change] | | | |
|---|---|---|---|---|---|
| | | In 0 h | In 2 h | In 4 h | In 8 h |
| Comparative Example 3 | 0.0 | 94000 | 83100 [88.4] | 73500 [78.2] | 57200 [60.9] |
| Example 11 | 8.0 | 120500 | 7200 [6.0] | 4500 [3.7] | 2300 [1.9] |
| Example 12 | 12.1 | 202400 | 4600 [2.3] | 2300 [1.1] | 780 [0.4] |

Molecular weight: Weight average molecular weight (Mw).

Change in molecular weight: Mw (X h)/Mw (0 h) x 100.

APPLICATION ASSESSMENT 1

The terpolymer prepared in Example 1 that had the building units shown below at molar ratios of 1:0.08:1 and an average molecular weight of 28,000 (as measured by GPC as a molecular weight of polyethyleneglycol) was neutralized with an aqueous solution of sodium hydroxide to form a builder salt.

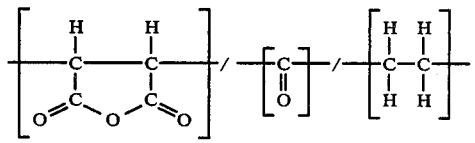

Using this builder salt, a detergent composition was prepared from the recipe noted below:

| LAS (Sodium alkylbenzenesulfonate) | 15 parts by weight |
|---|---|
| Builder salt | 17 parts by weight |
| Sodium silicate | 10 parts by weight |
| Sodium carbonate | 3 parts by weight |
| Glauber's salt | 58 parts by weight |
| CMC (carboxymethyl cellulose) | 1 part by weight |

Using artificial soil-test cloths, the detergency of this composition was measured in a wash liquor held at 25° C.

APPLICATION ASSESSMENT 2

The procedures of Application Assessment 1 were repeated in order to make a measurement of detergency, except that the temperature of the wash liquor was held at 60° C.

COMPARATIVE APPLICATION ASSESSMENT 1

The procedures of Application Assessment 1 were repeated in order to make a measurement of detergency, except that the builder salt of terpolymer in the detergent composition was replaced by 75 parts by weight of Glauber's salt.

COMPARATIVE APPLICATION ASSESSMENT 2

The procedures of Application Assessment 1 were repeated in order to make a measurement of detergency, except that the builder salt of terpolymer in the detergent composition was replaced by STPP.

The results of detergency tests conducted are summarized in Table 6.

TABLE 6

| | Application Assessment No. | | Comparative Application Assessment No. | |
|---|---|---|---|---|
| | 1 | 2 | 1 | 2 |
| Detergency (%) | 38 | 39 | 35 | 37 |

The detergency tests were conducted by the following procedures.

(1) Preparation of artificial soil-test cloths

Artificial soil having the composition noted below was dispersed in water and applied to a cloth by an aqueous solvent wet method. The soiled cloth was cut into square swatches (5 cm×5 cm). Those having a reflectance of 42±2% were selected as test cloths.

| Artificial soil composition (wt %) | |
|---|---|
| Organic matter: | (69.7) |
| Oleic acid | 28.3 |
| Triolein | 15.6 |
| Cholesterol oleate | 12.2 |
| Liquid paraffin | 2.5 |
| Squalene | 2.5 |
| Cholesterol | 1.6 |
| Gelatin | 7.0 |
| Inorganic matter: | (31.3) |
| Red and yellow soil | 29.8 |
| Carbon | 0.5 |

In the detergency tests, the bath ratio was adjusted by means of a sebum-impregnated cloth that was a sheet of knitted cotton fabric on which 60 mg of organic soil was deposited.

(2) Test method

Using a Terg-O-Tometer, the detergency tests were conducted under the washing conditions described below. The final surface reflectances of the washed soil cloths were read and the cleaning was expressed as percentage detergency:

$$\text{Percentage detergency} = \frac{\text{Soil cloth } (K/S) - \text{Washed cloth } (K/S)}{\text{Soil cloth } (K/S) - \text{Unsoiled cloth } (K/S)}$$

where $K/S = (1-R)^2/2R$ (the Kubelka-Munk equation) (R: the surface reflectance of each cloth).

| Washing conditions: | |
|---|---|
| Rotational speed | 120 rpm |
| Number of soil cloths | 10 |
| Volume of wash liquor | 900 ml |
| Hardness of water | 3 HD |
| Detergent concentration | 0.067 wt % |
| Bath ratio | 30 (adjusted with sebum-impregnated fabric) |
| Wash time | 10 min |
| Rinse time | 3 min × 2 |
| Drying | air drying followed by ironing |

While the invention has been described in detail and with reference to specific embodiments thereof, it will be apparent to one skilled in the art that various changes and modifications can be made therein without departing from the spirit and scope thereof.

What is claimed is:

1. A terpolymer whose backbone chain is composed of the following repeating units:

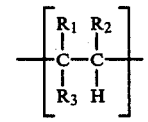

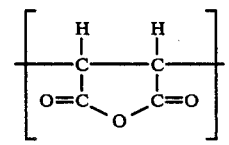

wherein $R_1$, $R_2$ and $R_3$ each is H, methyl or ethyl.

2. A terpolymer according to claim 1, wherein the building units (1), (2) and (3) are present in proportions of 5 to 80:0.1 to 40:10 to 90 on a mol % basis.

3. A terpolymer according to claim 1 which has an average molecular weight of 1,000 to 1,000,000 as measured by gel permeation chromatography.

4. A terpolymer according to claim 1, wherein $R_1$, $R_2$ and $R_3$ is each H.

5. A polyelectrolyte of a terpolymer whose backbone chain is composed of the following repeating units or of a salt thereof:

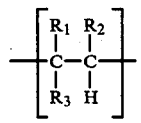

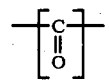

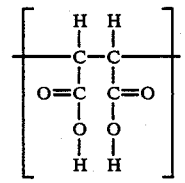

wherein $R_1$, $R_2$, and $R_3$ each is H, $CH_3$ or $C_2H_5$.

6. A polyelectrolyte according to claim 5, wherein said salt is selected from the group consisting of an alkali metal salt, an alkaline earth metal salt, an ammonium salt, and an amine salt.

7. A polyelectrolyte according to claim 5, wherein the repeating unit (1') is a group derived from ethylene or propylene.

8. A polyelectrolyte according to claim 15, wherein said terpolymer has an average molecular weight of 1,000 to 500,000 as measured by gel permeation chromatography.

9. A polyelectrolyte according to claim 5, wherein the repeating units (1'), (2') and (3') are present in proportions of 5 to 80:0.1 to 40:10 to 90 on a mol % basis.

10. A polyelectrolyte according to claim 6, wherein said salt is selected from among a sodium salt, a potassium salt, or a triethanolamine salt.

* * * * *